United States Patent
Khatiwada et al.

(10) Patent No.: US 11,987,536 B2
(45) Date of Patent: May 21, 2024

(54) ROCK FINES AS CARRIERS OF PLANT NUTRIENTS

(71) Applicant: Specialty Granules Investments LLC, Parsippany, NJ (US)

(72) Inventors: Raju Khatiwada, Hagerstown, MD (US); Daniel E Rardon, Greencastle, PA (US)

(73) Assignee: Specialty Granules Investments LLC, Parsippany, NJ (US)

( * ) Notice: Subject to any disclaimer, the term of this patent is extended or adjusted under 35 U.S.C. 154(b) by 0 days.

(21) Appl. No.: 17/952,899

(22) Filed: Sep. 26, 2022

(65) Prior Publication Data

US 2023/0183146 A1  Jun. 15, 2023

Related U.S. Application Data

(60) Provisional application No. 63/287,590, filed on Dec. 9, 2021.

(51) Int. Cl.
| | |
|---|---|
| C05G 1/00 | (2006.01) |
| C05B 7/00 | (2006.01) |
| C05C 5/04 | (2006.01) |
| C05D 1/02 | (2006.01) |
| C05D 9/02 | (2006.01) |
| C05F 11/02 | (2006.01) |
| C05G 5/12 | (2020.01) |
| C05G 5/14 | (2020.01) |
| C05G 5/40 | (2020.01) |

(52) U.S. Cl.
CPC ............... *C05G 1/00* (2013.01); *C05B 7/00* (2013.01); *C05C 5/04* (2013.01); *C05D 1/02* (2013.01); *C05D 9/02* (2013.01); *C05F 11/02* (2013.01); *C05G 5/12* (2020.02); *C05G 5/14* (2020.02); *C05G 5/40* (2020.02)

(58) Field of Classification Search
None
See application file for complete search history.

(56) References Cited

U.S. PATENT DOCUMENTS

| 8,623,111 B2 | 1/2014 | Detweiler et al. | |
|---|---|---|---|
| 10,717,682 B2 * | 7/2020 | McLaughlin | ............ C05D 9/02 |

(Continued)

FOREIGN PATENT DOCUMENTS

| CA | 2914547 A1 | 6/2016 |
|---|---|---|
| CN | 104909702 A | 9/2015 |

(Continued)

OTHER PUBLICATIONS

Gislason et al., "Carbon Storage in Basalt," Science, vol. 344, Apr. 25, 2014, pp. 373-374.

(Continued)

*Primary Examiner* — Wayne A Langel
(74) *Attorney, Agent, or Firm* — Venable LLP

(57) ABSTRACT

A method comprising (a) obtaining rock fines comprising at least one of basalt, metabasalt, diabase, rhyolite, andesite, meta-andesite, granite, graphite, talc, silica, sand, perlite, or a combination thereof, (b) obtaining a binder, (c) obtaining a material comprising at least one of Ca, Mg, S, B, Cl, Cu, Fe, Mn, Mo, Ni, Zn, or a combination thereof, and (d) combining ingredients comprising the rock fines, the binder, and the material.

28 Claims, 1 Drawing Sheet

(56) References Cited

U.S. PATENT DOCUMENTS

| | | |
|---|---|---|
| 10,766,627 B2 | 9/2020 | Horton et al. |
| 2016/0068451 A1* | 3/2016 | Uliveto .................. C05F 11/02 71/24 |
| 2018/0093921 A1 | 4/2018 | Ciuperca |
| 2018/0099907 A1 | 4/2018 | Ciuperca |
| 2018/0318893 A1 | 11/2018 | Roberts et al. |
| 2018/0325105 A1 | 11/2018 | Vadakekuttu et al. |
| 2019/0225556 A1 | 7/2019 | Babu et al. |
| 2019/0367412 A1 | 12/2019 | Decker |
| 2020/0115293 A1 | 4/2020 | Guinez |
| 2021/0040005 A1 | 2/2021 | Horton et al. |
| 2021/0178438 A1 | 6/2021 | Pham |

FOREIGN PATENT DOCUMENTS

| | | | |
|---|---|---|---|
| CN | 105777259 A | 7/2016 | |
| EP | 2258159 B1 | 4/2018 | |
| WO | 2012/083335 A1 | 6/2012 | |
| WO | WO 2021/240501 A1 * | 12/2021 | ............... C05G 5/12 |

OTHER PUBLICATIONS

Sep. 3, 2020 International Search Report and Written Opinion in International Patent Appln. No. PCT/US2020/045504.
Apr. 16, 2021 Canadian Official Action In Canadian Patent Appln. No. 3109628.
Jun. 28, 2021 Canadian Official Action in Canadian Patent Appln. No. 3109628.
MagmaHume Plant and Soil Fortifier: The basics of MagmaHume, Montys Plant & Soil Products, montysplantfood.com, https://montysplantfood.com/wp-content/uploads/2020/10/1171-MagmaHume-FAQ-4.17.20.pdf, 2020.
MagmaHume Plant and Soil Fortifier, Montys Plant Food Company, www.montysplantfood.com, https://montysplantfood.com/wp-content/uploads/2021/02/MagmaHume_50lb_FrontLabel-8827A.pdf, 2021.

* cited by examiner

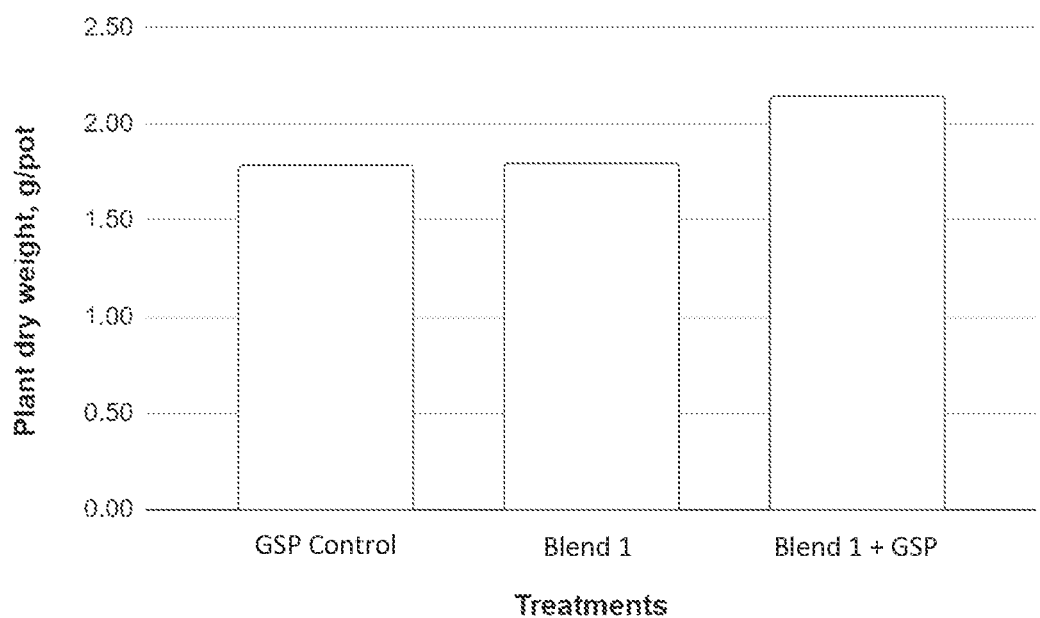

ROCK FINES AS CARRIERS OF PLANT NUTRIENTS

This application claims the priority of U.S. provisional application Ser. No. U.S. 63/287,590, entitled "Rock Fines as Carriers of Plant Nutrients" filed Dec. 9, 2021, which is incorporated herein by reference in its entirety for all purposes.

FIELD OF THE INVENTION

The invention relates to rock fines as carriers of plant nutrients, to methods of making the same, and to methods of using the same in agricultural, horticultural, or gardening applications, e.g., as a soil amendment, fertilizer, or the like.

BACKGROUND OF THE INVENTION

Soil amendments and fertilizers have been developed. Some include ingredients such as, for example, basalt (see, e.g., U.S. Pat. No. 10,766,827 B1) or sand, basalt, and limestone (e.g., Chinese Patent Appln. Pub. No. 105777259 A).

SUMMARY OF THE INVENTION

In one aspect, one embodiment relates to a method comprising: (1) obtaining rock fines comprising at least one of basalt, metabasalt, diabase, rhyolite, andesite, meta andesite, granite, graphite, talc, silica, sand, perlite, or a combination thereof; (2) obtaining a binder; (3) obtaining a material comprising at least one of Ca, Mg, S, B, Cl, Cu, Fe, Mn, Mo, Ni, Zn, or a combination thereof; (4) combining the rock fines, the binder, and the material; and (5) forming the combined rock fines, binder, and material into a product, wherein the rock fines are present in the product in an amount of 25 wt % to 95 wt % with respect to a total weight of the product, and wherein the binder is present in the product in an amount of 1 wt % to 5 wt % with respect to the total weight of the product.

According to one embodiment, the material is present in a sufficient amount such that one or more of the following conditions in the product are satisfied: (a) Ca is present in an amount of 0.1 wt % to 15 wt % with respect to the total weight of the product, (b) Mg is present in an amount of 0.1 wt % to 15 wt % with respect to the total weight of the product, (c) S is present in an amount of 0.1 wt % to 15 wt % with respect to the total weight of the product, (d) B is present in an amount of 0.1 wt % to 12 wt % with respect to the total weight of the product, (e) Cl is present in an amount of 0.1 wt % to 12 wt % with respect to the total weight of the product, (f) Cu is present in an amount of 0.1 wt % to 12 wt % with respect to the total weight of the product, (g) Fe is present in an amount of 0.1 wt % to 12 wt % with respect to the total weight of the product, (h) Mn is present in an amount of 0.1 wt % to 12 wt % with respect to the total weight of the product, (i) Mo is present in an amount of 0.01 wt % to 12 wt % with respect to the total weight of the product, (j) Ni is present in an amount of 0.01 wt % to 12 wt % with respect to the total weight of the product, or (k) Zn is present in an amount of 0.1 wt % to 15 wt % with respect to the total weight of the product.

According to an embodiment, at least one of the following conditions is satisfied: (1) the material comprises at least one of Mg, B, Cl, Cu, Fe, Mn, Mo, Ni, Zn, or a combination thereof, or (2) the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof, or (3) the material is other than lime, calcium carbonate, humic acid, elemental sulfur, lignosulfonate, sulfonated lignin, fulvic acid, or a combination thereof.

According to another embodiment, at least one of the following conditions is satisfied: (1) the forming comprises forming the combined rock fines, binder, and material into a pellet or a flake, or (2) the rock fines comprise basalt, metabasalt, diabase, rhyolite, andesite, meta andesite, granite, graphite, talc, perlite, or a combination thereof, wherein the basalt, metabasalt, diabase, rhyolite, andesite, meta andesite, granite, graphite, talc, perlite, or a combination thereof are present in the product in an amount of 25 wt % to 95 wt % with respect to the total weight of the product.

In one embodiment, the combining comprises using a pin mixer, milling, mixing, performing humidification mixing, or a combination thereof.

In one embodiment, the forming comprises granulation, compaction, pelletizing, using a disc pelletizer, or a combination thereof.

In one embodiment, the forming comprises compaction in a case where the product is a flake.

In one embodiment, the forming comprises pelletizing in a case where the product is a pellet, with the pellet having a diameter of 0.1 mm to 5 mm.

In one embodiment, the product is a pellet, wherein the pellet has a diameter of 0.1 mm to 2 mm.

In one embodiment, the product is a pellet, wherein the pellet has a diameter of 2 mm to 5 mm.

In one embodiment, the material comprises boric acid, wherein boron is present in the product in an amount of 0.1 wt % to 12 wt % with respect to the total weight of the product.

In one embodiment, boron is present in the product in an amount of 0.9 wt % to 4.4 wt % with respect to the total weight of the product.

In one embodiment, the material comprises boric acid, wherein the boric acid is present in the product in an amount of 0.01 wt % to 25 wt % with respect to the total weight of the product.

In one embodiment, the combining step further comprises combining humic acid with the rock fines, the binder (other than humic acid), and the material, wherein the humic acid is present in the product in an amount of 1 wt % to 5 wt % with respect to the total weight of the product.

In one embodiment, the product is a pellet.

In one embodiment, the binder comprises at least one of clay, seaweed, amino acids, corn syrup, sucrose, molasses, starch, lignosulfonate, soy protein isolate, soy protein hydrolysate, corn steep waste, or a combination thereof.

In one embodiment, the material comprises boric acid and zinc sulfate.

In one embodiment, boron is present in the product in an amount of 0.9 wt % to 4.4 wt % with respect to the total weight of the product, wherein Zn is present in the product in an amount of 1.2 wt % to 5.8 wt % with respect to the total weight of the product.

In one embodiment, the material comprises boric acid, zinc sulfate, manganese sulfate, and copper sulfate.

In one embodiment, the boric acid is present in the product in an amount of 0.01 wt % to 25 wt % with respect to the total weight of the product, wherein the zinc sulfate is present in the product in an amount of 0.01 wt % to 25 wt % with respect to the total weight of the product, wherein the manganese sulfate is present in the product in an amount of 0.01 wt % to 25 wt % with respect to the total weight of the product, and wherein the copper sulfate is present in the product in an amount of 0.01 wt % to 25 wt % with respect to the total weight of the product.

In one embodiment, the material comprises boric acid and sulfate of potash.

In one embodiment, at least one of the boric acid and the sulfate of potash is present in the product in an amount of 0.01 wt % to 25 wt % with respect to the total weight of the product.

In one embodiment, the boric acid is present in the product in an amount of 0.01 wt % to 25 wt % with respect to the total weight of the product, and the sulfate of potash is present in the product in an amount of 0.01 wt % to 25 wt % with respect to the total weight of the product.

In one embodiment, the material comprises monoammonium phosphate, calcium nitrate, boric acid, and zinc sulfate.

In one embodiment, at least one of the monoammonium phosphate, the calcium nitrate, the boric acid, or the zinc sulfate is present in the product in an amount of 0.01 wt % to 25 wt % with respect to the total weight of the product.

In one embodiment, the monoammonium phosphate is present in the product in an amount of 0.01 wt % to 25 wt % with respect to the total weight of the product, wherein the calcium nitrate is present in the product in an amount of 0.01 wt % to 25 wt % with respect to the total weight of the product, wherein the boric acid is present in the product in an amount of 0.01 wt % to 25 wt % with respect to the total weight of the product, and wherein the zinc sulfate is present in the product in an amount of 0.01 wt % to 25 wt % with respect to the total weight of the product.

In one embodiment, the combining step further comprises combining humic acid with the rock fines, the binder, and the material.

In one embodiment, the method further comprises drying the product using a fluidized bed dryer.

In one embodiment, the rock fines are present in the product in an amount of 75 wt % to 95 wt % with respect to the total weight of the product, wherein the material is present in a sufficient amount such that one or more of the following conditions in the product are satisfied: (a) Ca is present in an amount of 0.9 wt % to 15 wt % with respect to the total weight of the product, (b) Mg is present in an amount of 0.9 wt % to 15 wt % with respect to the total weight of the product, (c) S is present in an amount of 0.9 wt % to 15 wt % with respect to the total weight of the product, (d) B is present in an amount of 0.9 wt % to 5 wt % with respect to the total weight of the product, (e) Cl is present in an amount of 0.9 wt % to 5 wt % with respect to the total weight of the product, (f) Cu is present in an amount of 0.9 wt % to 5 wt % with respect to the total weight of the product, (g) Fe is present in an amount of 0.9 wt % to 10 wt % with respect to the total weight of the product, (h) Mn is present in an amount of 0.9 wt % to 5 wt % with respect to the total weight of the product, (i) Mo is present in an amount of 0.9 wt % to 5 wt % with respect to the total weight of the product, (j) Ni is present in an amount of 0.9 wt % to 5 wt % with respect to the total weight of the product, or (k) Zn is present in an amount of 0.9 wt % to 10 wt % with respect to the total weight of the product.

In one embodiment, the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium carbonate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

In one embodiment, the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof, and wherein each of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, and ammonium sulfate that is present in the product is present in an amount of 0.01-25 wt % with respect to the total weight of the product.

In one embodiment, the material comprises at least one of boric acid, zinc sulfate, manganese sulfate, copper sulfate, sulfate of potash, calcium nitrate, or a combination thereof.

In another aspect, one embodiment relates to an agglomerated particle comprising: (1) rock fines; and (2) a binder, wherein the binder agglomerates the rock fines together to form the agglomerated particle, wherein the rock fines comprise at least one of basalt, metabasalt, diabase, rhyolite, andesite, meta andesite, granite, graphite, talc, silica, sand, perlite, or a combination thereof, and wherein the agglomerated particle has at least one the following characteristics: (a) Mg is present in an amount of 0.1 wt % to 15 wt % with respect to a total weight of the agglomerated particle, (b) B is present in an amount of 0.1 wt % to 12 wt % with respect to a total weight of the agglomerated particle, (c) Cl is present in an amount of 0.1 wt % to 12 wt % with respect to a total weight of the agglomerated particle, (d) Cu is present in an amount of 0.1 wt % to 12 wt % with respect to a total weight of the agglomerated particle, (e) Fe is present in an amount of 0.1 wt % to 12 wt % with respect to a total weight of the agglomerated particle, (f) Mn is present in an amount of 0.1 wt % to 12 wt % with respect to a total weight of the agglomerated particle, (g) Mo is present in an amount of 0.01 wt % to 12 wt % with respect to a total weight of the agglomerated particle, (h) Ni is present in an amount of 0.01 wt % to 12 wt % with respect to a total weight of the agglomerated particle, or (i) Zn is present in an amount of 0.1 wt % to 15 wt % with respect to a total weight of the agglomerated particle.

In one embodiment, the agglomerated particle has at least one of the following characteristics: (a) Mg is present in an amount of 0.9 wt % to 15 wt % with respect to a total weight of the agglomerated particle, (b) B is present in an amount of 0.9 wt % to 5 wt % with respect to a total weight of the agglomerated particle, (c) Cl is present in an amount of 0.9 wt % to 5 wt % with respect to a total weight of the agglomerated particle, (d) Cu is present in an amount of 0.9 wt % to 5 wt % with respect to a total weight of the agglomerated particle, (e) Fe is present in an amount of 0.9 wt % to 10 wt % with respect to a total weight of the agglomerated particle, (f) Mn is present in an amount of 0.9 wt % to 5 wt % with respect to a total weight of the agglomerated particle, (g) Mo is present in an amount of 0.9 wt % to 5 wt % with respect to a total weight of the agglomerated particle, (h) Ni is present in an amount of 0.9 wt % to 5 wt % with respect to a total weight of the agglomerated particle, or (i) Zn is present in an amount of 0.9 wt % to 10 wt % with respect to a total weight of the agglomerated particle.

In one embodiment, S is present in an amount of 0.1 wt % to 15 wt % with respect to a total weight of the agglomerated particle.

In one embodiment, Ca is present in an amount of 0.1 wt % to 15 wt % with respect to a total weight of the agglomerated particle.

In another aspect, one embodiment relates to an agglomerated particle comprising: (a) rock fines including at least one of basalt, metabasalt, diabase, rhyolite, andesite, meta andesite, granite, graphite, talc, silica, sand, perlite, or a combination thereof, wherein the rock fines are present in the agglomerated particle in an amount of 25 wt % to 95 wt % with respect to a total weight of the agglomerated particle; (b) boric acid, in an amount of 0.01 wt % to 25 wt % with respect to the total weight of the agglomerated particle; and (c) humic acid, in an amount of 1 wt % to 5 wt % with respect to the total weight of the agglomerated particle.

In one embodiment, the agglomerated particle further comprises at least one of borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium carbonate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

In one embodiment, the agglomerated particle further comprises at least one of zinc sulfate, manganese sulfate, copper sulfate, sulfate of potash, monoammonium phosphate, calcium nitrate, or a combination thereof.

In one embodiment, the rock fines comprise at least one of basalt, metabasalt, or a combination thereof.

In one embodiment, the rock fines comprise basalt.

In one embodiment, the agglomerated particle further comprises zinc sulfate in an amount of 0.01 wt % to 25 wt % with respect to the total weight of the agglomerated particle.

In one embodiment, the agglomerated particle further comprises (a) manganese sulfate in an amount of 0.01 wt % to 25 wt % with respect to the total weight of the agglomerated particle, and (b) copper sulfate in an amount of 0.01 wt % to 25 wt % with respect to the total weight of the agglomerated particle.

In one embodiment, the agglomerated particle further comprises (a) monoammonium phosphate in an amount of 0.01 wt % to 25 wt % with respect to the total weight of the agglomerated particle, and (b) calcium nitrate in an amount of 0.01 wt % to 25 wt % with respect to the total weight of the agglomerated particle.

In one embodiment, the agglomerated particle further comprises sulfate of potash in an amount of 0.01 wt % to 25 wt % with respect to the total weight of the agglomerated particle.

In one embodiment, the agglomerated particle has a diameter of 0.1 mm to 5 mm.

In one embodiment, the agglomerated particle has a diameter of 0.1 mm to 2 mm.

In one embodiment, the agglomerated particle has a diameter of 2 mm to 5 mm.

In one embodiment, the agglomerated particle further comprises a binder comprising at least one of clay, seaweed, amino acids, corn syrup, sucrose, molasses, starch, lignosulfonate, soy protein isolate, soy protein hydrolysate, corn steep waste, or a combination thereof.

In one embodiment, the binder is present in an amount of 1 wt % to 5 wt % with respect to the total weight of the agglomerated particle.

In one embodiment, the agglomerated particle further comprises monoammonium phosphate, calcium nitrate, and zinc sulfate, with at least one of the monoammonium phosphate, the calcium nitrate, or the zinc sulfate being present in the product in an amount of 0.01 wt % to 25 wt % with respect to the total weight of the agglomerated particle.

In yet another aspect, one embodiment relates to a method comprising: (1) obtaining rock fines including at least one of basalt, metabasalt, diabase, rhyolite, andesite, meta andesite, granite, graphite, talc, silica, sand, perlite, or a combination thereof; (2) obtaining boric acid; (3) obtaining a binder; (4) obtaining humic acid; and (5) processing ingredients comprising the rock fines, the boric acid, the binder, and the humic acid to obtain a pellet in which the ingredients are agglomerated together, wherein the processing comprises mixing and pelletizing, wherein the rock fines are present in the pellet in an amount of 25 wt % to 95 wt % with respect to a total weight of the pellet, wherein the boric acid is present in the pellet in an amount of 0.01 wt % to 25 wt % with respect to the total weight of the pellet, wherein the binder is present in the pellet in an amount of 1 wt % to 5 wt % with respect to the total weight of the pellet, and wherein the humic acid is present in the pellet in an amount of 1 wt % to 5 wt % with respect to the total weight of the pellet.

In another aspect, one embodiment relates to a method comprising: (1) obtaining rock fines comprising at least one of basalt, metabasalt, diabase, rhyolite, andesite, meta-andesite, granite, graphite, talc, silica, sand, perlite, or a combination thereof; (2) obtaining a binder; (3) obtaining a material comprising at least one of Ca, Mg, S, B, Cl, Cu, Fe, Mn, Mo, Ni, Zn, or a combination thereof; (4) combining the rock fines, the binder, and the material; (5) forming the combined rock fines, binder, and material into a product; and (6) applying the product to a field having seeds, plants, or a combination thereof planted therein.

In one embodiment, the method further comprises mixing the product with a base fertilizer comprising: urea-monoammonium phosphate-potassium chloride (grower's standard practice (GSP)) prior to the applying the product to a field.

In one embodiment, the material comprises boric acid, wherein the boric acid is present in the product in an amount of 0.01 wt % to 25 wt % with respect to a total weight of the product.

In one embodiment, the rock fines comprise at least one of basalt, metabasalt, or a combination thereof.

In one embodiment, the rock fines are present in the product in an amount of 25 wt % to 95 wt % with respect to a total weight of the product.

In one embodiment, the binder is present in the product in an amount of 1 wt % to 5 wt % with respect to a total weight of the product.

In an embodiment, the combining step further comprises combining humic acid with the rock fines, the binder, and the material.

In one embodiment, the humic acid is present in the product in an amount of 1 wt % to 5 wt % with respect to the total weight of the product.

In one embodiment, the binder comprises at least one of clay, seaweed, amino acids, corn syrup, sucrose, molasses, starch, lignosulfonate, soy protein isolate, soy protein hydrolysate, corn steep waste, or a combination thereof.

In one embodiment, the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

BRIEF DESCRIPTION OF THE FIGURES

For a more complete understanding of the invention and the advantages thereof, reference is made to the following descriptions, taken in conjunction with the accompanying FIGURE, in which:

FIG. 1 is a graph illustrating the effect of a boron formulation on plant growth according to an embodiment of the invention.

DETAILED DESCRIPTION

1. Introduction, Definitions, and Abbreviations

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, all examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, all ranges are inclusive of endpoints unless otherwise specified.

As used herein, "between" when referring to a range shall include both mentioned endpoints (for example, "between 1 wt % and 15 wt %" shall include both 1 wt % and 15 wt %), unless otherwise specified.

The terms "substantially", "approximately," and "about" used throughout this Specification and the claims generally mean plus or minus 10% of the value stated, e.g., about 100 would include 90 to 110. Thus, as used herein, the term "about X" means X plus or minus 10%. For example, "about 10 wt %" means 9 wt % to 11 wt %.

As used herein, "wt %" refers to weight percent.

As used herein, the term "binder" refers to a compound that can bind a plurality of basalt particles together. The "binder" can either be liquid or solid.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, where the expression "or a combination thereof" follows a list of more than two items, the expression is not limited to requiring presence of all of the items, but is also intended to encompass every subset thereof having any number of items from the list. Thus, for example, "at least one of Ca, Mg, S, or a combination thereof" encompasses (1) Ca, (2) Mg, (3) S, (4) Ca and Mg, (5) Ca and S, (6) Mg and S, and (7) Ca, Mg, and S.

As used herein, where a material is said to comprise a type of atom, the material is not intended to be limited to the elemental form of the atom in question, but instead is intended to also encompass compounds containing the atom. For example, "a material comprising B" is not limited to a material that includes elemental boron, but instead also encompasses a material that includes a boron-containing compound, such as a material comprising boric acid, borax, colemanite, potassium tetraborate, ulexite or a combination thereof.

In like fashion, as used herein "X is present in the product," where X is an atomic symbol (e.g., "B is present in the product"), refers to the presence of X in the product but does not require that any or all of X be present in elemental form. For example, where the product includes boric acid, it can be said that "B is present in the product" irrespective of whether B is present in the product in elemental form.

As used herein, the following abbreviations, symbols, and expressions are defined as follows:

(a) Primary Fertilizers

MAP=Monoammonium Phosphate
DAP=Diammonium Phosphate
AMS=Ammonium Sulfate
SOP=Sulfate of Potash
MOP=Muriate of Potash
SSP=Single Super Phosphate
TSP=Triple Super Phosphate
   "Primary Fertilizers" include urea, MAP, DAP, AMS, SOP, MOP, SSP, and TSP.

(b) Primary Macronutrients

N=Nitrogen
P=Phosphorus
K=Potassium;
"Primary Macronutrients" include N, P, and K.

(c) Secondary Macronutrients

Ca=Calcium
Mg=Magnesium
S=Sulfur
"Secondary Macronutrients" include Ca, Mg, and S.

(d) Micronutrients

B=Boron
Cl=Chlorine
Cu=Copper
Fe=Iron
Mn=Manganese
Mo=Molybdenum
Ni=Nickel
Zn=Zinc
"Micronutrients" include B, Cl, Cu, Fe, Mn, Mo, Ni, and Zn

(e) Miscellaneous

Si=Silicon
Co=Cobalt
Se=Selenium

"NPK+S" refers to N, P, and K (all of which are, as explained above, primary macronutrients) and S (which is, as explained above, a secondary macronutrient)

2. Description

(a) METHOD FOR PREPARING PRODUCT COMPRISING ROCK FINES AND NUTRIENT MATERIAL

One embodiment pertains to using rock fines as carriers of (i) secondary macronutrients and/or (ii) micronutrients. In this embodiment, a product is prepared by a method that comprises obtaining ingredients and processing them. The ingredients include (a) rock fines and (b) a material, hereinafter referred to as "nutrient material," that provides (i) secondary macronutrients and/or (ii) micronutrients. In a case where the rock fines themselves include secondary macronutrients and/or micronutrients, the nutrient material can be thought of as providing additional secondary macronutrients and/or micronutrients, thereby complementing the rock fines' secondary macronutrients and/or micronutrients. While two ingredients, namely rock fines and the nutrient material, have been described above, any other desired ingredient or ingredients may also be included (e.g., a binder, humic acid, etc., as discussed in more detail below). The product resulting from the method can be used as, for example, a soil amendment, fertilizer, etc.

Method

In an embodiment a method comprises: (1) obtaining rock fines comprising at least one of basalt, metabasalt, diabase, rhyolite, andesite, meta andesite, granite, graphite, talc, silica, sand, perlite, or a combination thereof; (2) obtaining a binder; (3) obtaining a material comprising at least one of Ca, Mg, S, B, Cl, Cu, Fe, Mn, Mo, Ni, Zn, or a combination thereof; (4) combining the rock fines, the binder, and the material; and (5) forming the combined rock fines, binder, and material into a product.

(i) Bulk Form Product

In one embodiment, the method comprises combining the ingredients together, thereby obtaining (or forming) a "bulk form" product. In one embodiment, the combining comprises mixing.

(ii) Pelletized Product

In other embodiments, the forming results in a pelletized product (also referred to as a "pellet," "granule," "agglomerated particle," "agglomerated granule," or the like). A plurality of pellets may be produced in one batch of the method.

To obtain the pelletized product, in one embodiment, the forming comprises pelletizing, granulation, or compaction.

Granulation refers to a procedure involving steps comprising:
  (1) using a pin mixer, to mix the ingredients together,
  (2) using a disc pelletizer, to pelletize the mixed ingredients thereby creating a plurality of pellets,
  (3) using a fluidized bed dryer, to dry the pellets,
  (4) screening the dried pellets to desired particle size, and
  (5) packaging the product, e.g., bagging the dried pellets.

Compaction refers to a procedure involving steps comprising:
  (1) using a mill, to mix the raw material,
  (2) performing humidification mixing, to provide adequate moisture for binding,
  (3) performing compacting of the mixture using a compaction roller to form a granule (4) drying the granule, (5) performing screening, and (6) packaging the product.

The drying, screening, and packaging for compaction are as discussed above with respect to granulation.

(iii) Flaked Product

In another embodiment, the forming results in a flaked product (also referred to as a "flake"). A plurality of flakes may be produced in one batch of the method.

To obtain the flaked product, in one embodiment, the forming comprises compaction as described above but using counter-rotating rolls to press powdery material of the ingredients into sheets which are crushed to form flakes (i.e., step (3) is "performing compacting of the mixture using counter-rotating rolls to press powdery material of the ingredients into sheets which are crushed to form flakes).

(iv) Size of Product

In one embodiment where the product is a pellet, the product's diameter (or average diameter of a plurality thereof) is 0.1 mm to 2 mm (which is referred to as "turf grade"). In another embodiment where the product is a pellet, the product's diameter (or average diameter of a plurality thereof) is 2 mm to 5 mm (which is referred to as "field grade"). Other ranges include 0.1 mm to 1 mm, 1 mm to 2 mm, and 0.5 mm to 10 mm. Combinations of the above-referenced ranges are also possible (i.e., any of the lower and upper limits mentioned may constitute a range). For example, other ranges include 0.1 mm to 10 mm. 0.5 mm to 2 mm, etc.

In one embodiment where the product is a flake, the product's largest dimension (or average largest dimension) are any of the ranges mentioned above.

(b) ROCK FINES

Non-limiting examples of rock fines that may be used include at least one of basalt, amphibolite produced from the metamorphism of the basalt parent such as meta-basalt (also referred to as metabasalt), diabase, rhyolite, andesite, meta-andesite, granite, graphite, talc, silica, sand, perlite or a combination thereof. As mentioned above, the rock fines may, in and of themselves, include (i) secondary macronutrients and/or (ii) micronutrients. The rock fines may further include one or more essential plant nutrients, examples of which include Si, Co, and Se. Of these, Si is considered to be a beneficial element for plants, and rock fines having Si content are believed to make plants structurally stronger as well as to help mitigate infections and abiotic stresses. Thus, for example, some rock fines may themselves provide a number of secondary macronutrients, micronutrients, and/or essential plant nutrients, e.g., in one embodiment, the rock fines themselves provide, for example, (1) the secondary macronutrient Ca, (2) the micronutrients Fe and Mg, and (3) the essential plant nutrient Si.

In some embodiments, the rock fines include rock fines with sizes (e.g., diameter) or average sizes (e.g., average diameter) ranging from 2 μm to 0.5 mm, or 2 μm to 1.5 mm, or 0.01 mm to 0.5 mm, or 0.01 mm to 1 mm, or 0.01 mm to 2 mm. Combinations of the above-referenced ranges are also possible (i.e., any of the lower and upper limits mentioned may constitute a range), e.g., 2 μm to 2 mm. Sub-micron rock fines may also be included. In some embodiments, 50%-95% of the rock fines have sizes falling within the above-referenced ranges or combinations thereof. In some embodiments, 60%-90% of the rock fines have sizes falling within the above-referenced ranges or combinations thereof. In some embodiments, 70%-80% of the rock fines have sizes falling within the above-referenced ranges or combinations thereof. Combinations of the above-referenced ranges are also possible (i.e., any of the lower and upper limits mentioned may constitute a range), e.g., 60%-70%.

In one embodiment, the rock fines are present in the product in an amount of 25-50 wt % with respect to the total weight of the product, or 40-75 wt % with respect to the total weight of the product, or 50-95 wt % with respect to the total weight of the product, or 75-95 wt % with respect to the total weight of the product. Combinations of the above-referenced ranges are also possible (i.e., any of the lower and upper limits mentioned may constitute a range). For example, other ranges include 25-95 wt %, 40-75 wt %, etc.

In some embodiments, the rock fines comprise at least one of basalt, metabasalt, diabase, rhyolite, andesite, meta-andesite, granite, graphite, talc, perlite, or a combination thereof. The aforementioned ranges may pertain to such rock fines.

As discussed above, one example of rock fines is basalt; however, metabasalt (which is an amphibolite produced from the metamorphism of the basalt parent material) may be used in addition to or instead of basalt. In other words, where the embodiments use the term basalt, they should be read as describing the use of basalt, metabasalt, or a combination of basalt and metabasalt.

(c) NUTRIENT MATERIAL

As discussed above, when preparing the product in some embodiments, in addition to the rock fines, a second ingredient may be the nutrient material, which provides (i) secondary macronutrients and/or (ii) micronutrients. In one embodiment, the nutrient material comprises at least one of Ca, Mg, S, B, Cl, Cu, Fe, Mn, Mo, Ni, Zn, or a combination thereof. Among these, as explained above, Ca, Mg, and S are secondary macronutrients, and B, Cl, Cu, Fe, Mn, Mo, Ni, and Zn are micronutrients. Using such a material may make it possible to obtain a complete secondary macronutrient and/or micronutrient composition required by plants.

In some embodiments, the nutrient material may comprise at least one of a Ca-containing compound, a Mg-containing compound, a S-containing compound, a B-containing compound, a Cl-containing compound, a Cl-containing compound, a Cu-containing compound, a Fe-containing compound, a Mn-containing compound, a Mo-containing compound, a Ni-containing compound, a Zn containing-compound, or a combination thereof.

In some embodiments, the nutrient material and in particular the Ca-containing compound may be separate and distinct from lime or calcium carbonate present in the product.

In some embodiments, the nutrient material and in particular the S-containing compound may be separate and distinct from humic acid, elemental sulfur, lignosulfonate, sulfonated lignin, or fulvic acid present in the product.

In some embodiments, the nutrient material may include, for example, at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium carbonate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof. (Sulfate of potash provides 50 wt % K$_2$O equivalent and 18 wt % S, so while sulfate of potash is classified as a primary fertilizer, it is also used to supply the secondary macronutrient S.)

In some embodiments, the nutrient material may include, for example, at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

In one embodiment, the nutrient material is present in the product in an amount of 0.01-3 wt % with respect to the total weight of the product, or 3-20 wt % with respect to the total weight of the product, or 5-25 wt % with respect to the total weight of the product. Combinations of the above-referenced ranges are also possible (i.e., any of the lower and upper limits mentioned may constitute a range). For example, other ranges include 0.01-25 wt %, 3-25 wt %, etc. Where the nutrient material includes plural components (e.g., boric acid and zinc sulfate), the ranges are applicable to the nutrient material as a whole and/or to any individual component.

(d) ADDITIONAL INGREDIENT(S)

In some embodiment, in addition to the rock fines and the nutrient material, an additional ingredient or additional ingredients may be used to prepare the product. Such may include, for example, at least one of humic acid, a binder, a primary fertilizer (e.g., MAP), or a combination thereof.

In one embodiment, the binder may include, for example, clay, seaweed, amino acids, corn syrup, sucrose, molasses, starch, lignosulfonate, soy protein isolate or hydrolysate, corn steep waste, inorganic acid, organic acid, organic fertilizer(s), or a combination thereof. The binder may agglomerate together the rock fines (and any other ingredients) to provide a cohesive combination of ingredients. In one embodiment, the binder may be present in the product in an amount of 0.1-2 wt % with respect to the total weight of the product, or 1-2 wt % with respect to the total weight of the product, or 1-5 wt % with respect to the total weight of the product, or 3 wt % with respect to the total weight of the product. Combinations of the above-referenced ranges are also possible (i.e., any of the lower and upper limits mentioned may constitute a range). For example, other ranges include 0.1-5 wt %, 3-5 wt %, etc.

In one embodiment, the combining step further comprises combining humic acid with the rock fines, the binder (other than humic acid), and the material.

In some embodiments, the humic acid may be present in the product in an amount of 0.2-1 wt % with respect to the total weight of the product, or 0.5-3 wt % with respect to the total weight of the product, or 1-5 wt % with respect to the total weight of the product, or 3 wt % with respect to the total weight of the product. Combinations of the above-referenced ranges are also possible (i.e., any of the lower and upper limits mentioned may constitute a range). For example, other ranges include 0.2-5 wt %, 0.2-3 wt %, etc.

In some embodiments, one or more primary fertilizers (e.g., MAP) may be included as an ingredient of the product. As a result of the inclusion of one or more primary fertilizers, at least one of N, P, K, or a combination thereof may be present in the product. In such a case, in one embodiment, N may be present in an amount of 0.5-2 wt %, 1-3 wt %, or 3-20 wt % with respect to the total weight of the product, and/or P may be present in an amount of 0.5-2 wt %, 1-3 wt %, or 3-20 wt % with respect to the total weight of the product, and/or K may be present in an amount of 0.5-2 wt %, 1-3 wt %, or 3-20 wt % with respect to the total weight of the product. Combinations of the above-referenced ranges are also possible (i.e., any of the lower and upper limits mentioned may constitute a range). For example, other ranges include 0.5-3 wt %, 2-3 wt %, etc.

However, inclusion of a primary fertilizer in the product is not required; indeed, in one embodiment, the use of rock fines may eliminate the need to use primary fertilizers (e.g., urea, MAP, etc.) as carriers of secondary macronutrients and/or micronutrients. In this regard, where a primary fertilizer is used as a carrier of secondary macronutrients and/or micronutrients, (1) the secondary macronutrients and/or micronutrients may be applied to the primary fertilizer as a powder coating, which may lead to dusting, blending, and handling issues, (2) over application of primary fertilizer may lead to leaf burning, plant growth, and compatibility issues, (3) use of an NPK+S-based fertilizer may result in acidity issues, (4) a product using a primary fertilizer as a carrier of secondary macronutrients and/or micronutrients may lack the ability to provide Si to plants and to sequester carbon, and (5) some products may be highly concentrated (e.g., zinc oxide, 80 wt % Zn (i.e., zinc oxide is one of the most concentrated sources for zinc)) and lack uniformity on application and generate hotspots and undesirable effects in the field. Accordingly, it may be possible to omit primary fertilizers from the product or to use a small amount. To this end, in one embodiment, the product lacks N, or N may be present in an amount of less than 25 wt %, or less than 10 wt %, or less than 3 wt %, based on the total weight of the product. In one embodiment, the product lacks P, or P may be present in an amount of less than 25 wt %, or less than 10 wt %, or less than 3 wt %, based on the total weight of the product. In one embodiment, the product lacks K, or K may be present in an amount of less than 25 wt %, or less than 10 wt %, or less than 3 wt %, based on the total weight of the product.

(e) METHOD OF APPLYING A PRODUCT COMPRISING ROCK FINES AND NUTRIENT MATERIAL

One embodiment pertains to a method comprising: (1) obtaining rock fines comprising at least one of basalt, metabasalt, diabase, rhyolite, andesite, meta-andesite, granite, graphite, talc, silica, sand, perlite, or a combination thereof; (2) obtaining a binder; (3) obtaining a material comprising at least one of Ca, Mg, S, B, Cl, Cu, Fe, Mn, Mo, Ni, Zn, or a combination thereof; (4) combining the rock fines, the binder, and the material; (5) forming the combined rock fines, binder, and material into a product, and (6) applying the product to a field having seeds, plants, or a combination thereof planted therein.

In one embodiment, the method further comprises mixing the product with a base fertilizer comprising: urea-monoammonium phosphate-potassium chloride (grower's standard practice (GSP)) prior to the applying the product to a field.

In one embodiment, the combining step further comprises combining humic acid with the rock fines, the binder, and the material.

(f) EXAMPLES

Specific embodiments of the invention will now be demonstrated by reference to the following examples. It should be understood that these examples are disclosed by way of illustrating the invention and should not be taken in any way to limit the scope of the present invention.

Example 1

This first example includes rock fines plus a micronutrient source (namely, boric acid, which provides boron), and has the following ingredients:

| component/ingredient | wt % | Comment |
| --- | --- | --- |
| basalt | 80 | rock fines |
| boric acid | 15 | Micronutrient |
| humic acid | 3 | |
| binder | 2 | |

The elemental analysis of the product includes the following:

| nutrient | wt % | Comment |
| --- | --- | --- |
| boron | 2.6 | |
| calcium | 1.6 | provided by basalt |
| iron | 4 | provided by basalt |
| magnesium | 2.4 | provided by basalt |
| silicon | 16 | provided by basalt |

The elemental analysis was performed as follows: (1) a conversion factor of 0.175 was used to convert boric acid to boron wt %, and (2) for other elements present in basalt, conversion was performed based on the label for Magma-Hume™ Plant and Soil Fortifier. In particular, that product label lists "soil amending active ingredients" of 0.75 wt % humic acids and 99.25 wt % other ingredients (basalt), and analysis as follows: 2 wt % Ca, 3 wt % Mg, 0.004 wt % Co, 5 wt % Fe, 0.08 wt % Mn (all derived from basalt), and silica ($SiO_2$) 22 wt % (also derived from basalt). From this analysis, the above elemental analysis of the Examples herein was obtained.

The product is provided in pelletized form.

Example 2

This example includes rock fines plus two micronutrient sources (namely, boric acid, which provides boron, and zinc sulfate, which provides zinc), and has the following ingredients:

| component/ingredient | wt % | comment |
| --- | --- | --- |
| basalt | 75 | rock fines |
| boric acid | 10 | first micronutrient |
| zinc sulfate | 10 | second micronutrient |
| humic acid | 3 | |
| binder | 2 | |

The elemental analysis of the product includes the following:

| nutrient | wt % | comment |
| --- | --- | --- |
| boron | 1.75 | |
| zinc | 2.3 | |
| calcium | 1.5 | provided by basalt |
| iron | 3.75 | provided by basalt |
| magnesium | 2.25 | provided by basalt |
| silicon | 15 | provided by basalt |

The product is provided in pelletized form.

Example 3

This example includes rock fines plus four micronutrient sources (namely, boric acid, which provides boron; zinc sulfate, which provides zinc; manganese sulfate, which provides manganese; and copper sulfate, which provides copper), and has the following ingredients:

| component/ingredient | wt % | comment |
| --- | --- | --- |
| basalt | 75 | rock fines |
| boric acid | 5 | first micronutrient |
| zinc sulfate | 5 | second micronutrient |
| manganese sulfate | 5 | third micronutrient |
| copper sulfate | 5 | fourth micronutrient |
| humic acid | 3 | |
| binder | 2 | |

The product is provided in pelletized form.

Example 4

This example includes rock fines plus (a) a macronutrient source (namely, sulfate of potash) and (b) a micronutrient source (namely, boric acid), and has the following ingredients:

| component/ingredient | wt % | comment |
| --- | --- | --- |
| basalt | 70 | rock fines |
| sulfate of potash | 20 | macronutrient |
| boric acid | 5 | micronutrient |
| humic acid | 3 | |
| binder | 2 | |

The product is provided in pelletized form.

Example 5

This example includes rock fines plus (a) two macronutrient sources (namely, MAP and calcium nitrate) and (b) two micronutrient sources (namely, boric acid and zinc sulfate), and has the following ingredients:

| component/ingredient | wt % | comment |
|---|---|---|
| basalt | 65 | rock fines |
| MAP | 10 | first macronutrient |
| calcium nitrate | 10 | second macronutrient |
| boric acid | 5 | first micronutrient |
| zinc sulfate | 5 | second micronutrient |
| humic acid | 3 | |
| binder | 2 | |

The product is provided in pelletized form.

Example 6

In this example, the product is a granule, and the rock fines are present in the product in an amount of 50-95 wt % with respect to the total weight of the product. Furthermore, the product includes a sufficient amount of a source of secondary micronutrients and/or micronutrients (i.e., the nutrient material), such that at least one of Ca, Mg, S, B, Cl, Cu, Fe, Mn, No, Ni, Zn, or a combination thereof, is present in the product in the amounts listed below:

| component/ingredient | wt % range | wt % first alternate range | wt % second alternate range | wt % example |
|---|---|---|---|---|
| B | 0.1-3 | 3-12 | 0.9-5 (or 0.9-4.4) | 5 |
| Cl | 0.1-3 | 3-12 | 0.9-5 | 5 |
| Cu | 0.1-3 | 3-12 | 0.9-5 | 3 |
| Fe | 0.1-3 | 3-12 | 0.9-10 | 10 |
| Mn | 0.1-3 | 3-12 | 0.9-5 | 5 |
| Mo | 0.01-3 | 3-12 | 0.9-5 | 3 |
| Ni | 0.01-3 | 3-12 | 0.9-5 | 3 |
| Zn | 0.1-3 | 3-15 | 1.2-5.8 | 10 |
| Ca | 0.1-3 | 3-15 | 0.9-15 | 15 |
| Mg | 0.1-3 | 3-15 | 0.9-15 | 15 |
| S | 0.1-3 | 3-15 | 0.9-15 | 15 |

This table shows three alternate ranges for each material, as well as a specific example for that material. Combinations of the ranges are also possible (i.e., any of the lower and upper limits or specific examples mentioned may constitute a range). For example, for B, other ranges include 0.1-12 wt %, 3-4.4 wt %, etc.

Also, in this example, humic acid may be present in the product, in an amount as discussed above. Likewise, a binder may be present, in an amount as discussed above. Likewise, N, P, K, or a combination thereof may be present, in respective amounts as discussed above.

Furthermore, in this example, Co and/or Se may be present in the product, each in the ranges specified above with respect to Mo. Also in this example, Si may be present in the range specified above with respect to Ca.

Example 7

In this example, a growth chamber study was conducted to study the effect of a boric acid formulation (labeled as "Blend 1" below) on plant growth and nutrient uptake. For this study, corn seeds (SC 1158AM brand) were planted in 2 L pots containing the following potting mix: 50% Pennsylvania Top Soil+20% Vermiculite+10% Perlite+20% sand. A base fertilizer comprising a water solution made from urea, monoammonium phosphate, and potassium chloride was prepared and applied at planting. In particular, this base fertilizer, which consisted of 120-100-100 NPK (i.e., nitrogen (N), phosphorus (P), and potassium (K)) pounds per acre equivalent, was applied at planting for fertilizer treatments (grower's standard practice (GSP)). The "Blend 1" formulation, which is detailed below, was applied at a rate of 45 pounds per acre equivalent for treatments receiving boron (e.g., boric acid). Approximately 300 ml of water was applied twice a week for each pot. Plants were harvested at the V4 growth stage (i.e., vegetative growth stage 4), and analyzed for above-ground plant biomass and nutrient uptake. Plant dry weight was determined by drying above-ground plant tissue for 24 hours at 220° F. Dried plant tissue biomass was ground to fine powder, digested and analyzed by a third-party lab using inductively coupled plasma (ICP) for elemental uptake.

As discussed above, the "Blend 1" or boron formulation used for this example is the following: 8% Boric Acid+2% Dry humics (Mesa Verde High Grade Pulverized)+88% Metabasalt+2% Molasses as Binder.

The results of this study, including the effect of the boron ("Blend 1") formulation on plant growth, are shown in FIG. 1, as well as Table 1 below:

TABLE 1

| Sample ID | N | P | K | Mg | Ca | S | Fe | Cu | Zn | B |
|---|---|---|---|---|---|---|---|---|---|---|
| | % | | | | | | mg/kg | | | |
| GSP Control | 6.3 | 0.7 | 6.5 | 0.3 | 0.9 | 0.28 | 182 | 9 | 57 | 8 |
| Blend 1 | 7.1 | 0.6 | 6.8 | 0.4 | 0.8 | 0.31 | 153 | 12 | 51 | 25 |
| Blend 1 + GSP | 6.7 | 0.7 | 6.5 | 0.4 | 1.1 | 0.33 | 209 | 12 | 67 | 33 |

N = nitrogen; P = phosphorus, K = potassium, Mg = magnesium, Ca = Calcium, S = sulfur, Fe = Iron, Cu = Copper, Zn = Zinc, B = Boron The results in FIG. 1, as well as Table 1 above, show that by adding the "Blend 1" formulation, plant biomass increased by 0.6% and boron tissue concentration increased by 212% as compared to the GSP-only control. A plant receiving both GSP and the "Blend 1" formulation had a biomass increase of 20% and a boron tissue concentration increase of 312% as compared to the GSP-only control treatment. Also, a plant receiving both GSP and the "Blend 1" formulation had 6% higher nitrogen, 18% higher sulfur, 33% higher copper, 15% higher iron, 22% higher calcium, and 33% higher magnesium as compared to GSP-only control.

INDUSTRIAL APPLICABILITY

In view of the foregoing, it is possible to use rock fines as carriers of secondary macronutrients and/or micronutrients, whereby a product acting as a soil amendment, fertilizer, etc., may be provided, such that nutrients may be delivered to plants. It is believed that the product will reduce dusting issues and minimize nutrient immobilization issues. Furthermore, the product may have a lower concentration of nutrients which would allow uniform distribution of nutrients.

CONCLUSION

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the description.

At least some non-limiting aspects the present disclosure will now be described with reference to the following numbered embodiments hereinafter designated as E1-E59:

E1. A method comprising:
obtaining rock fines comprising at least one of basalt, metabasalt, diabase, rhyolite, andesite, meta-andesite, granite, graphite, talc, silica, sand, perlite, or a combination thereof;
obtaining a binder;
obtaining a material comprising at least one of Ca, Mg, S, B, Cl, Cu, Fe, Mn, Mo, Ni, Zn, or a combination thereof;
combining the rock fines, the binder, and the material;
forming the combined rock fines, binder, and material into a product,
wherein the rock fines are present in the product in an amount of 25 wt % to 95 wt % with respect to a total weight of the product, and
wherein the binder is present in the product in an amount of 1 wt % to 5 wt % with respect to the total weight of the product.

E2. A method according to E1, wherein the material is present in a sufficient amount such that one or more of the following conditions in the product are satisfied: (a) Ca is present in an amount of 0.1 wt % to 15 wt % with respect to the total weight of the product, (b) Mg is present in an amount of 0.1 wt % to 15 wt % with respect to the total weight of the product, (c) S is present in an amount of 0.1 wt % to 15 wt % with respect to the total weight of the product, (d) B is present in an amount of 0.1 wt % to 12 wt % with respect to the total weight of the product, (e) Cl is present in an amount of 0.1 wt % to 12 wt % with respect to the total weight of the product, (f) Cu is present in an amount of 0.1 wt % to 12 wt % with respect to the total weight of the product, (g) Fe is present in an amount of 0.1 wt % to 12 wt % with respect to the total weight of the product, (h) Mn is present in an amount of 0.1 wt % to 12 wt % with respect to the total weight of the product, (i) Mo is present in an amount of 0.01 wt % to 12 wt % with respect to the total weight of the product, (j) Ni is present in an amount of 0.01 wt % to 12 wt % with respect to the total weight of the product, or (k) Zn is present in an amount of 0.1 wt % to 15 wt % with respect to the total weight of the product.

E3. A method according to E1, wherein at least one of the following conditions is satisfied: (1) the material comprises at least one of Mg, B, Cl, Cu, Fe, Mn, Mo, Ni, Zn, or a combination thereof, or (2) the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof, or (3) the material is other than lime, calcium carbonate, humic acid, elemental sulfur, lignosulfonate, sulfonated lignin, fulvic acid, or a combination thereof.

E4. A method according to E1, wherein at least one of the following conditions is satisfied: (1) the forming comprises forming the combined rock fines, binder, and material into a pellet or a flake, or (2) the rock fines comprise basalt, metabasalt, diabase, rhyolite, andesite, meta-andesite, granite, graphite, talc, perlite, or a combination thereof, wherein the basalt, metabasalt, diabase, rhyolite, andesite, meta-andesite, granite, graphite, talc, perlite, or a combination thereof are present in the product in an amount of 25 wt % to 95 wt % with respect to the total weight of the product.

E5. A method according to E1, wherein the combining comprises using a pin mixer, milling, mixing, performing humidification mixing, or a combination thereof.

E6. A method according to E1, wherein the forming comprises granulation, compaction, pelletizing, using a disc pelletizer, or a combination thereof.

E7. A method according to E6, wherein the forming comprises (i) compaction in a case where the product is a flake, or (ii) pelletizing in a case where the product is a pellet, with the pellet having a diameter of 0.1 mm to 5 mm.

E8 A method according to E1, wherein the product is a pellet, and wherein the pellet has a diameter of 0.1 mm to 2 mm.

E9. A method according to E1, wherein the product is a pellet, and
wherein the pellet has a diameter of 2 mm to 5 mm.

E10. A method according to E1, wherein the material comprises boric acid, and
wherein boron is present in the product in an amount of 0.1 wt % to 12 wt % with respect to the total weight of the product.

E11. A method according to E10, wherein boron is present in the product in an amount of 0.9 wt % to 4.4 wt % with respect to a total weight of the product.

E12. A method according to E1, wherein the material comprises boric acid,
wherein the boric acid is present in the product in an amount of 0.01 wt % to 25 wt % with respect to the total weight of the product.

E13. A method according to E1, wherein the combining step further comprises combining humic acid with the rock fines, the binder, and the material, and wherein the humic acid is present in the product in an amount of 1 wt % to 5 wt % with respect to the total weight of the product.

E14. A method according to E1, wherein the product is a pellet.

E15. A method according to E1, wherein the binder comprises at least one of clay, seaweed, amino acids, corn syrup, sucrose, molasses, starch, lignosulfonate, soy protein isolate, soy protein hydrolysate, corn steep waste, or a combination thereof.

E16. A method according to E1, wherein the material comprises boric acid and zinc sulfate.

E17. A method according to E16, wherein boron is present in the product in an amount of 0.9 wt % to 4.4 wt % with respect to the total weight of the product, and
wherein Zn is present in the product in an amount of 1.2 wt % to 5.8 wt % with respect to the total weight of the product.

E18. A method according to E1, wherein the material comprises boric acid, zinc sulfate, manganese sulfate, and copper sulfate.

E19. A method according to E18, wherein the boric acid is present in the product in an amount of 0.01 wt % to 25 wt % with respect to a total weight of the product, wherein the zinc sulfate is present in the product in an amount of 0.01 wt % to 25 wt % with respect to the total weight of the product, wherein the manganese sulfate is present in the product in an amount of 0.01 wt % to 25 wt % with respect to the total weight of the product, and wherein the copper sulfate is present in the product in an amount of 0.01 wt % to 25 wt % with respect to the total weight of the product.

E20. A method according to E1, wherein the material comprises boric acid and sulfate of potash.

E21. A method according to E20, wherein at least one of the boric acid and the sulfate of potash is present in the product in an amount of 0.01 wt % to 25 wt % with respect to the total weight of the product.

E22. A method according to E1, wherein the material comprises monoammonium phosphate, calcium nitrate, boric acid, and zinc sulfate.

E23. A method according to E22, wherein at least one of the monoammonium phosphate, the calcium nitrate, the boric acid, or the zinc sulfate is present in the product in an amount of 0.01 wt % to 25 wt % with respect to the total weight of the product.

E24. A method according to E22, wherein the monoammonium phosphate is present in the product in an amount of 0.01 wt % to 25 wt % with respect to the total weight of the product, wherein the calcium nitrate is present in the product in an amount of 0.01 wt % to 25 wt % with respect to the total weight of the product, wherein the boric acid is present in the product in an amount of 0.01 wt % to 25 wt % with respect to the total weight of the product, and wherein the zinc sulfate is present in the product in an amount of 0.01 wt % to 25 wt % with respect to the total weight of the product.

E25. A method according to E1, wherein the combining step further comprises combining humic acid with the rock fines, the binder, and the material.

E26. A method according to E1, further comprising drying the product using a fluidized bed dryer.

E27. A method according to E1, wherein the rock fines are present in the product in an amount of 75 wt % to 95 wt % with respect to the total weight of the product, and wherein the material is present in a sufficient amount such that one or more of the following conditions in the product are satisfied: (a) Ca is present in an amount of 0.9 wt % to 15 wt % with respect to the total weight of the product, (b) Mg is present in an amount of 0.9 wt % to 15 wt % with respect to the total weight of the product, (c) S is present in an amount of 0.9 wt % to 15 wt % with respect to the total weight of the product, (d) B is present in an amount of 0.9 wt % to 5 wt % with respect to the total weight of the product, (e) Cl is present in an amount of 0.9 wt % to 5 wt % with respect to the total weight of the product, (f) Cu is present in an amount of 0.9 wt % to 5 wt % with respect to the total weight of the product, (g) Fe is present in an amount of 0.9 wt % to 10 wt % with respect to the total weight of the product, (h) Mn is present in an amount of 0.9 wt % to 5 wt % with respect to the total weight of the product, (i) Mo is present in an amount of 0.9 wt % to 5 wt % with respect to the total weight of the product, (j) Ni is present in an amount of 0.9 wt % to 5 wt % with respect to the total weight of the product, or (k) Zn is present in an amount of 0.9 wt % to 10 wt % with respect to the total weight of the product.

E28. A method according to E1, wherein the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

E29. A method according to E1, wherein the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof, and wherein each of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, and ammonium sulfate that is present in the product is present in an amount of 0.01-25 wt % with respect to the total weight of the product.

E30. A method according to E1, wherein the material comprises at least one of boric acid, zinc sulfate, manganese sulfate, copper sulfate, sulfate of potash, calcium nitrate, or a combination thereof.

E31. An agglomerated particle comprising:
rock fines; and
a binder,
wherein the binder agglomerates the rock fines together to form the agglomerated particle,
wherein the rock fines comprise at least one of basalt, metabasalt, diabase, rhyolite, andesite, meta-andesite, granite, graphite, talc, silica, sand, perlite, or a combination thereof, and
wherein the agglomerated particle has at least one the following characteristics: (a) Mg is present in an amount of 0.1 wt % to 15 wt % with respect to a total weight of the agglomerated particle, (b) B is present in an amount of 0.1 wt % to 12 wt % with respect to a total weight of the agglomerated particle, (c) Cl is present in an amount of 0.1 wt % to 12 wt % with respect to a total weight of the agglomerated particle, (d) Cu is present in an amount of 0.1 wt % to 12 wt % with respect to a total weight of the agglomerated particle, (e) Fe is present in an amount of 0.1 wt % to 12 wt % with respect to a total weight of the agglomerated particle, (f) Mn is present in an amount of 0.1 wt % to 12 wt % with respect to a total weight of the agglomerated particle, (g) Mo is present in an amount of 0.01 wt % to 12 wt % with respect to a total weight of the agglomerated particle, (h) Ni is present in an amount of 0.01 wt % to 12 wt % with respect to a total weight of the agglomerated particle, or (i) Zn is present in an amount of 0.1 wt % to 15 wt % with respect to a total weight of the agglomerated particle.

E32. An agglomerated particle according to E31, wherein the agglomerated particle has at least one of the following characteristics: (a) Mg is present in an amount of 0.9 wt % to 15 wt % with respect to a total weight of the agglomerated particle, (b) B is present in an amount of 0.9 wt % to 5 wt % with respect to a total weight of the agglomerated particle, (c) Cl is present in an amount of 0.9 wt % to 5 wt % with respect to a total weight of the agglomerated particle, (d) Cu is present in an amount of 0.9 wt % to 5 wt % with respect to a total weight of the agglomerated particle, (e) Fe is present in an amount of 0.9 wt % to 10 wt % with respect to a total weight of the agglomerated particle, (f) Mn is present in an amount of 0.9 wt % to 5 wt % with respect to a total weight of the agglomerated particle, (g) Mo is present in an amount of 0.9 wt % to 5 wt % with respect to a total weight of the agglomerated particle, (h) Ni is present in an amount of 0.9 wt % to 5 wt % with respect to a total weight of the agglomerated particle, or (i) Zn is present in an amount of 0.9 wt % to 10 wt % with respect to a total weight of the agglomerated particle.

E33. An agglomerated particle according to E31, wherein S is present in an amount of 0.1 wt % to 15 wt % with respect to a total weight of the agglomerated particle.

E34. An agglomerated particle according to E31, wherein Ca is present in an amount of 0.1 wt % to 15 wt % with respect to a total weight of the agglomerated particle.

E35. An agglomerated particle comprising:
(a) rock fines including at least one of basalt, metabasalt, diabase, rhyolite, andesite, meta-andesite, granite, graphite, talc, silica, sand, perlite, or a combination thereof, wherein the rock fines are present in the agglomerated particle in an amount of 25 wt % to 95 wt % with respect to a total weight of the agglomerated particle;
(b) boric acid, in an amount of 0.01 wt % to 25 wt % with respect to the total weight of the agglomerated particle; and
(c) humic acid, in an amount of 1 wt % to 5 wt % with respect to the total weight of the agglomerated particle.

E36. An agglomerated particle according to E35, further comprising at least one of borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium carbonate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

E37. An agglomerated particle according to E35, further comprising at least one of zinc sulfate, manganese sulfate, copper sulfate, sulfate of potash, monoammonium phosphate, calcium nitrate, or a combination thereof.

E38. An agglomerated particle according to E35, wherein the rock fines comprise at least one of basalt, metabasalt, or a combination thereof.

E39. An agglomerated particle according to E35, wherein the rock fines comprise basalt.

E40. An agglomerated particle according to E35, further comprising zinc sulfate in an amount of 0.01 wt % to 25 wt % with respect to the total weight of the agglomerated particle.

E41. An agglomerated particle according to E35, further comprising (a) manganese sulfate in an amount of 0.01 wt % to 25 wt % with respect to the total weight of the agglomerated particle, and (b) copper sulfate in an amount of 0.01 wt % to 25 wt % with respect to the total weight of the agglomerated particle.

E42. An agglomerated particle according to E35, further comprising
(a) monoammonium phosphate in an amount of 0.01 wt % to 25 wt % with respect to the total weight of the agglomerated particle, and (b) calcium nitrate in an amount of 0.01 wt % to 25 wt % with respect to the total weight of the agglomerated particle.

E43. An agglomerated particle according to E35, further comprising sulfate of potash in an amount of 0.01 wt % to 25 wt % with respect to the total weight of the agglomerated particle.

E44. An agglomerated particle according to E35, wherein the agglomerated particle has a diameter of 0.1 mm to 5 mm.

E45. An agglomerated particle according to E35, wherein the agglomerated particle has a diameter of 0.1 mm to 2 mm.

E46. An agglomerated particle according to E35, wherein the agglomerated particle has a diameter of 2 mm to 5 mm.

E47. An agglomerated particle according to E35, further comprising a binder comprising at least one of clay, seaweed, amino acids, corn syrup, sucrose, molasses, starch, lignosulfonate, soy protein isolate, soy protein hydrolysate, corn steep waste, or a combination thereof.

E48. An agglomerated particle according to E47, wherein the binder is present in an amount of 1 wt % to 5 wt % with respect to the total weight of the agglomerated particle.

E49. An agglomerated particle according to E35, further comprising monoammonium phosphate, calcium nitrate, and zinc sulfate, with at least one of the monoammonium phosphate, the calcium nitrate, or the zinc sulfate being present in the product in an amount of 0.01 wt % to 25 wt % with respect to the total weight of the agglomerated particle.

E50. A method comprising:
obtaining rock fines including at least one of basalt, metabasalt, diabase, rhyolite, andesite, meta-andesite, granite, graphite, talc, silica, sand, perlite, or a combination thereof;
obtaining boric acid;
obtaining a binder;
obtaining humic acid; and
processing ingredients comprising the rock fines, the boric acid, the binder, and the humic acid to obtain a pellet in which the ingredients are agglomerated together,
wherein the processing comprises mixing and pelletizing,
wherein the rock fines are present in the pellet in an amount of 25 wt % to 95 wt % with respect to a total weight of the pellet,
wherein the boric acid is present in the pellet in an amount of 0.01 wt % to 25 wt % with respect to the total weight of the pellet,
wherein the binder is present in the pellet in an amount of 1 wt % to 5 wt % with respect to the total weight of the pellet, and wherein the humic acid is present in the pellet in an amount of 1 wt % to 5 wt % with respect to the total weight of the pellet.

E51. A method comprising:
obtaining rock fines comprising at least one of basalt, metabasalt, diabase, rhyolite, andesite, meta-andesite, granite, graphite, talc, silica, sand, perlite, or a combination thereof;
obtaining a binder;
obtaining a material comprising at least one of Ca, Mg, S, B, Cl, Cu, Fe, Mn, Mo, Ni, Zn, or a combination thereof;
combining the rock fines, the binder, and the material;
forming the combined rock fines, binder, and material into a product; and
applying the product to a field having seeds, plants, or a combination thereof planted therein.

E52. A method according to E51, further comprising mixing the product with a base fertilizer comprising urea-monoammonium phosphate-potassium chloride (grower's standard practice (GSP)) prior to the applying the product to a field.

E53. A method according to E51, wherein the material comprises boric acid, and wherein the boric acid is present in the product in an amount of 0.01 wt % to 25 wt % with respect to a total weight of the product.

E54. A method according to E51, wherein the rock fines comprise at least one of basalt, metabasalt, or a combination thereof.

E55. A method according to E51, wherein the rock fines are present in the product in an amount of 25 wt % to 95 wt % with respect to the total weight of the product.

E56. A method according to E51, wherein the binder is present in the product in an amount of 1 wt % to 5 wt % with respect to the total weight of the product.

E57. A method according to E51, wherein the combining step further comprises combining humic acid with the rock fines, the binder, and the material, and wherein the humic acid is present in the product in an amount of 1 wt % to 5 wt % with respect to the total weight of the product.

E58. A method according to E51, wherein the binder comprises at least one of clay, seaweed, amino acids, corn syrup, sucrose, molasses, starch, lignosulfonate, soy protein isolate, soy protein hydrolysate, corn steep waste, or a combination thereof.

E59. A method according to E51, wherein the material comprises at least one of boric acid, borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

While foregoing embodiments have been described as using basalt, the invention is not limited to basalt. For example, metabasalt, which is an amphibolite produced from the metamorphism of the basalt parent, may be used in addition to or instead of basalt. In other words, where the embodiments herein use the term basalt, they should be read as describing the use of basalt, metabasalt, or a combination of basalt and metabasalt. The wt % amount of basalt described above should be read as wt % amount of metabasalt in the case where metabasalt is used instead of basalt, and should be read as wt % amount of basalt and metabasalt combined in the case where metabasalt is used in addition to basalt.

Furthermore, in some embodiments, the soil amendment composition is substantially free of basalt, and in some embodiments, the soil amendment composition is substantially free of metabasalt. The expression "substantially free" refers to less than 3 wt % with respect to the total weight of the soil amendment composition.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:
1. An agglomerated particle comprising:
rock fines comprising (1) at least one of basalt, metabasalt, or a combination thereof and (2) at least one of diabase, rhyolite, andesite, meta-andesite, granite, graphite, talc, perlite, or a combination thereof;
a material comprising B; and
a binder comprising at least one of seaweed, corn syrup, sucrose, molasses, soy protein isolate, soy protein hydrolysate, corn steep waste, or a combination thereof;
wherein the (1) at least one of basalt, metabasalt, or a combination thereof and (2) at least one of diabase, rhyolite, andesite, meta-andesite, granite, graphite, talc, perlite, or a combination thereof are collectively pres- ent in the agglomerated particle in an amount of 25 wt % to 95 wt % with respect to a total weight of the agglomerated particle,
wherein the binder is present in the agglomerated particle in an amount of 1 wt % to 5 wt % with respect to the total weight of the agglomerated particle,
wherein B is present in the agglomerated particle in an amount of 0.1 wt % to 3 wt % with respect to the total weight of the agglomerated particle,
wherein Fe is present in the agglomerated particle in an amount of 0.9 wt % to 12 wt % with respect to the total weight of the agglomerated particle,
wherein Mn is present in the agglomerated particle in an amount of 0.9 wt % to 12 wt % with respect to the total weight of the agglomerated particle,
wherein Mo is present in the agglomerated particle in an amount of 0.01 wt % to 3 wt % with respect to the total weight of the agglomerated particle,
wherein Zn is present in the agglomerated particle in an amount of 0.1 wt % to 3 wt % with respect to the total weight of the agglomerated particle, and
wherein Ca is present in the agglomerated particle in an amount of 0.9 wt % to 15 wt % with respect to the total weight of the agglomerated particle.

2. The agglomerated particle according to claim 1, wherein Cu is present in the agglomerated particle in an amount of 0.1 wt % to 3 wt % with respect to the total weight of the agglomerated particle,
wherein Ni is present in the agglomerated particle in an amount of 0.01 wt % to 3 wt % with respect to the total weight of the agglomerated particle, and
wherein one or more of the following conditions in the agglomerated particle are satisfied:
(a) Ca is present in an amount of 3 wt % to 15 wt % with respect to the total weight of the agglomerated particle,
(b) Mg is present in an amount of 0.1 wt % to 15 wt % with respect to the total weight of the agglomerated particle,
(c) S is present in an amount of 0.1 wt % to 15 wt % with respect to the total weight of the agglomerated particle,
(d) Cl is present in an amount of 0.1 wt % to 12 wt % with respect to the total weight of the agglomerated particle,
(e) Fe is present in an amount of 3 wt % to 12 wt % with respect to the total weight of the agglomerated particle, or
(f) Mn is present in an amount of 3 wt % to 12 wt % with respect to the total weight of the agglomerated particle.

3. The agglomerated particle according to claim 1, wherein the agglomerated particle is a pellet having a diameter of 0.1 mm to 5 mm.

4. The agglomerated particle according to claim 1, wherein the binder comprises molasses,
wherein the material comprises boric acid,
wherein the boric acid is present in the agglomerated particle in an amount of 0.01 wt % to 25 wt % with respect to the total weight of the agglomerated particle, and
wherein the material further comprises (1) iron sulfate, (2) manganese sulfate, (3) one or both of sodium molybdate and ammonium molybdate, (4) zinc sulfate, and (5) one or both of calcium sulfate and calcium nitrate.

5. The agglomerated particle according to claim 1, further comprising humic acid,
wherein the humic acid is present in the agglomerated particle in an amount of 1 wt % to 5 wt % with respect to the total weight of the agglomerated particle.

6. The agglomerated particle according to claim 1, wherein one or both of the following conditions are satisfied:
(a) the material comprises boric acid and sulfate of potash, with at least one of the boric acid and the sulfate of potash being present in the agglomerated particle in an amount of 0.01 wt % to 25 wt % with respect to the total weight of the agglomerated particle; or
(b) the material comprises monoammonium phosphate, calcium nitrate, boric acid, and zinc sulfate, with at least one of the monoammonium phosphate, the calcium nitrate, the boric acid, or the zinc sulfate being present in the agglomerated particle in an amount of 0.01 wt % to 25 wt % with respect to the total weight of the agglomerated particle.

7. The agglomerated particle according to claim 1, wherein the material further comprises at least one of zinc oxide, zinc carbonate, zinc amino acid complex, manganese oxide, manganese amino acid complex, copper oxide, copper carbonate, copper amino acid complex, iron sulfate, iron amino acid complex, calcium amino acid complex, magnesium oxide, magnesium amino acid complex, sodium molybdate, potassium molybdate, ammonium molybdate tetrahydrate, ammonium sulfate, or a combination thereof.

8. The agglomerated particle according to claim 1, wherein the material comprises boric acid.

9. The agglomerated particle according to claim 1, wherein the agglomerated particle includes at least one of borax, colemanite, ulexite, potassium tetraborate, zinc oxide, zinc sulfate, zinc carbonate, zinc amino acid complex, manganese oxide, manganese sulfate, manganese amino acid complex, copper oxide, copper sulfate, copper carbonate, copper amino acid complex, iron sulfate, iron oxide, iron amino acid complex, sulfate of potash, potassium chloride, calcium sulfate, calcium nitrate, calcium amino acid complex, magnesium oxide, magnesium sulfate, magnesium amino acid complex, sodium molybdate, potassium molybdate, ammonium molybdate tetrahydrate, ammonium sulfate, or a combination thereof.

10. The agglomerated particle according to claim 1, wherein the binder comprises molasses.

11. The agglomerated particle according to claim 1, wherein the agglomerated particle is a agglomerated particle for application to a field having seeds, plants, or a combination thereof planted therein.

12. The agglomerated particle according to claim 1, wherein the material comprises boric acid, and
wherein the boric acid is present in the agglomerated particle in an amount of 0.01 wt % to 25 wt % with respect to a total weight of the agglomerated particle.

13. The agglomerated particle according to claim 1, wherein the rock fines are present in the agglomerated particle in an amount of 75 wt % to 95 wt % with respect to a total weight of the agglomerated particle.

14. The agglomerated particle according to claim 1, wherein the binder comprises at least one of molasses, corn steep waste, or a combination thereof.

15. The agglomerated particle according to claim 1, wherein one or more of the following conditions is satisfied:
(A) the material further comprises at least one of zinc oxide, manganese oxide, copper oxide, magnesium oxide, or a combination thereof;
(B) the material further comprises at least one of manganese amino acid complex, copper amino acid complex, iron amino acid complex, calcium amino acid complex, magnesium amino acid complex, or a combination thereof;

(C) the material further comprises at least one of sodium molybdate, potassium molybdate, ammonium molybdate tetrahydrate, or a combination thereof;

(D) B is present in an amount of 2.6 wt % to 12 wt % with respect to a total weight of the agglomerated particle.

16. The agglomerated particle according to claim 1, wherein the material is boric acid, borax, colemanite, ulexite, or potassium tetraborate.

17. The agglomerated particle according to claim 1, wherein the agglomerated particle includes only one material comprising B.

18. A composition comprising the agglomerated particle according to claim 1 and a fertilizer comprising urea-monoammonium phosphate-potassium chloride.

19. An agglomerated particle comprising:
rock fines comprising at least one of basalt, metabasalt, diabase, rhyolite, andesite, meta-andesite, granite, graphite, talc, perlite, or a combination thereof;
a material comprising B; and
a binder comprising at least one of seaweed, corn syrup, sucrose, molasses, soy protein isolate, soy protein hydrolysate, corn steep waste, or a combination thereof;
wherein the at least one of basalt, metabasalt, diabase, rhyolite, andesite, meta-andesite, granite, graphite, talc, perlite, or a combination thereof are present in the agglomerated particle in an amount of 25 wt % to 95 wt % with respect to a total weight of the agglomerated particle,
wherein the binder is present in the agglomerated particle in an amount of 1 wt % to 5 wt % with respect to the total weight of the agglomerated particle,
wherein B is present in the agglomerated particle in an amount of 0.1 wt % to 3 wt % with respect to the total weight of the agglomerated particle,
wherein Fe is present in the agglomerated particle in an amount of 0.9 wt % to 12 wt % with respect to the total weight of the agglomerated particle,
wherein Mn is present in the agglomerated particle in an amount of 0.9 wt % to 12 wt % with respect to the total weight of the agglomerated particle,
wherein Mo is present in the agglomerated particle in an amount of 0.01 wt % to 3 wt % with respect to the total weight of the agglomerated particle,
wherein Zn is present in the agglomerated particle in an amount of 0.1 wt % to 3 wt % with respect to the total weight of the agglomerated particle,
wherein Ca is present in the agglomerated particle in an amount of 0.9 wt % to 15 wt % with respect to the total weight of the agglomerated particle, and
wherein the agglomerated particle is formed as a flake.

20. The agglomerated particle according to claim 19, wherein Cu is present in the agglomerated particle in an amount of 0.1 wt % to 3 wt % with respect to the total weight of the agglomerated particle,
wherein Ni is present in the agglomerated particle in an amount of 0.01 wt % to 3 wt % with respect to the total weight of the agglomerated particle, and
wherein one or more of the following conditions in the agglomerated particle are satisfied:
(a) Ca is present in an amount of 3 wt % to 15 wt % with respect to the total weight of the agglomerated particle,
(b) Mg is present in an amount of 0.1 wt % to 15 wt % with respect to the total weight of the agglomerated particle,
(c) S is present in an amount of 0.1 wt % to 15 wt % with respect to the total weight of the agglomerated particle,
(d) Cl is present in an amount of 0.1 wt % to 12 wt % with respect to the total weight of the agglomerated particle,
(e) Fe is present in an amount of 3 wt % to 12 wt % with respect to the total weight of the agglomerated particle, or
(f) Mn is present in an amount of 3 wt % to 12 wt % with respect to the total weight of the agglomerated particle.

21. The agglomerated particle according to claim 19, wherein the binder comprises molasses,
wherein the material comprises boric acid,
wherein the boric acid is present in the agglomerated particle in an amount of 0.01 wt % to 25 wt % with respect to the total weight of the agglomerated particle, and
wherein the material further comprises (1) iron sulfate, (2) manganese sulfate, (3) one or both of sodium molybdate and ammonium molybdate, (4) zinc sulfate, and (5) one or both of calcium sulfate and calcium nitrate.

22. The agglomerated particle according to claim 19, further comprising humic acid,
wherein the humic acid is present in the agglomerated particle in an amount of 1 wt % to 5 wt % with respect to the total weight of the agglomerated particle.

23. The agglomerated particle according to claim 19, wherein one or both of the following conditions are satisfied:
(a) the material comprises boric acid and sulfate of potash, with at least one of the boric acid and the sulfate of potash being present in the agglomerated particle in an amount of 0.01 wt % to 25 wt % with respect to the total weight of the agglomerated particle; or
(b) the material comprises monoammonium phosphate, calcium nitrate, boric acid, and zinc sulfate, with at least one of the monoammonium phosphate, the calcium nitrate, the boric acid, or the zinc sulfate being present in the agglomerated particle in an amount of 0.01 wt % to 25 wt % with respect to the total weight of the agglomerated particle.

24. The agglomerated particle according to claim 19, wherein the material further comprises at least one of zinc oxide, zinc carbonate, zinc amino acid complex, manganese oxide, manganese amino acid complex, copper oxide, copper carbonate, copper amino acid complex, iron sulfate, iron amino acid complex, calcium amino acid complex, magnesium oxide, magnesium amino acid complex, sodium molybdate, potassium molybdate, ammonium molybdate tetrahydrate, ammonium sulfate, or a combination thereof.

25. The agglomerated particle according to claim 19, wherein the material comprises boric acid.

26. The agglomerated particle according to claim 19, wherein the rock fines are present in the agglomerated particle in an amount of 75 wt % to 95 wt % with respect to a total weight of the agglomerated particle.

27. The agglomerated particle according to claim 19, wherein one or more of the following conditions is satisfied:
(A) the material further comprises at least one of zinc oxide, manganese oxide, copper oxide, magnesium oxide, or a combination thereof;
(B) the material further comprises at least one of manganese amino acid complex, copper amino acid complex, iron amino acid complex, calcium amino acid complex, magnesium amino acid complex, or a combination thereof;
(C) the material further comprises at least one of sodium molybdate, potassium molybdate, ammonium molybdate tetrahydrate, or a combination thereof;

(D) B is present in the agglomerated particle in an amount of 2.6 wt % to 12 wt % with respect to a total weight of the agglomerated particle.

28. An agglomerated particle comprising:

rock fines comprising at least one of basalt, metabasalt, diabase, rhyolite, andesite, meta-andesite, granite, graphite, talc, perlite, or a combination thereof;

a material comprising B; and a binder comprising at least one of seaweed, corn syrup, sucrose, molasses, soy protein isolate, soy protein hydrolysate, corn steep waste, or a combination thereof;

wherein the at least one of basalt, metabasalt, diabase, rhyolite, andesite, meta-andesite, granite, graphite, talc, perlite, or a combination thereof are present in the agglomerated particle in an amount of 25 wt % to 95 wt % with respect to a total weight of the agglomerated particle, wherein the binder is present in the agglomerated particle in an amount of 1 wt % to 5 wt % with respect to the total weight of the agglomerated particle, wherein B is present in the agglomerated particle in an amount of 0.1 wt % to 3 wt % with respect to the total weight of the agglomerated particle, wherein Fe is present in the agglomerated particle in an amount of 0.9 wt % to 12 wt % with respect to the total weight of the agglomerated particle, wherein Mn is present in the agglomerated particle in an amount of 0.9 wt % to 12 wt % with respect to the total weight of the agglomerated particle, wherein Mo is present in the agglomerated particle in an amount of 0.01 wt % to 3 wt % with respect to the total weight of the agglomerated particle, wherein Zn is present in the agglomerated particle in an amount of 0.1 wt % to 3 wt % with respect to the total weight of the agglomerated particle, wherein Ca is present in the agglomerated particle in an amount of 0.9 wt % to 15 wt % with respect to the total weight of the agglomerated particle, and wherein B is present in the agglomerated particle in an amount of at least 1.4 wt % with respect to the total weight of the agglomerated particle.

* * * * *